(12) United States Patent
Bassler et al.

(10) Patent No.: US 7,509,726 B2
(45) Date of Patent: Mar. 31, 2009

(54) WORKPIECE

(75) Inventors: Juergen Bassler, Winnenden (DE); Stefan Boell, Illemensee (DE)

(73) Assignee: Robert Bosch GmbH, Stuttgart (DE)

( * ) Notice: Subject to any disclaimer, the term of this patent is extended or adjusted under 35 U.S.C. 154(b) by 465 days.

(21) Appl. No.: 11/247,228

(22) Filed: Oct. 12, 2005

(65) Prior Publication Data

US 2006/0075616 A1    Apr. 13, 2006

Related U.S. Application Data

(62) Division of application No. 10/432,433, filed as application No. PCT/DE01/04386 on Nov. 23, 2001, now abandoned.

(30) Foreign Application Priority Data

Nov. 25, 2000   (DE)   ................................ 100 58 592

(51) Int. Cl.
  *B23P 11/00*   (2006.01)
  *B23P 11/02*   (2006.01)

(52) U.S. Cl. .......................................... 29/508; 29/516
(58) Field of Classification Search .................. 336/96, 336/90, 92; 29/508, 515, 516, 517
See application file for complete search history.

(56) References Cited

U.S. PATENT DOCUMENTS

| 4,624,489 A | * | 11/1986 | Nakamura ................... 285/382 |
| 5,710,535 A | * | 1/1998 | Goloff ......................... 336/192 |
| 5,718,131 A | * | 2/1998 | Bobbitt, III ................... 70/184 |
| 5,890,287 A | * | 4/1999 | Fukaya ..................... 29/890.14 |
| 2002/0073758 A1 | * | 6/2002 | Rempe et al. .............. 72/370.1 |

* cited by examiner

*Primary Examiner*—Anh T Mai
(74) *Attorney, Agent, or Firm*—Ronald E. Greigg

(57) ABSTRACT

A workpiece according to the invention has a recess that is compressed by means of a plastic deformation, which reduces one dimension or an inner diameter of the workpiece and thus joins this workpiece to an inner piece in a positively and frictionally engaging manner.

9 Claims, 2 Drawing Sheets

WORKPIECE

CROSS-REFERENCE TO RELATED APPLICATIONS

This application is a divisional of application Ser. No. 10/432,433 filed on Nov. 12, 2003 now abandoned, which is a 35 USC 371 application of PCT/DE 01/04386 filed on Nov. 23, 2001.

BACKGROUND OF THE INVENTION

1. Field of the Invention

The invention is directed to a workpiece and more particularly to a plastically deformable workpiece for joining to another piece.

2. Description of the Prior Art

So-called flared joints are known in which two workpieces are first slid one into the other so that the one workpiece rests against a stop of the other and protrudes above it with an edge, the flared edge. The joint is produced through flanging, the flaring, of the flared edge onto the one workpiece so that the workpieces are joined in a positively engaging manner. In this type of joint, two workpieces are required and it is only possible to achieve a definite contour of the flanging of the flared edge through costly measures. A flared edge must often be provided around the entire circumference of a workpiece. After the joining, there is thus often an axial and/or radial projection.

Another known type of joint is the so-called dovetail joint in which tolerances must be very strictly maintained. In the joining process, a projecting part and a recess of the dovetail joint are placed one over the other and are then pressed one into the other, as described in DE 39 25 365 A1. In the process of this, the parts must be placed one over the other and are not slid one into the other, thus rendering it necessary to make the parts that are to be connected somewhat longer and thus increasing the tolerance, for example of an inner diameter of a tube element.

DE 38 15 927 A1 has disclosed a joining of shaped parts by means of elastic securing arms. This design, however, inevitably leaves gaps between the shaped parts. It is not possible to produce a gap-free transition between the shaped parts.

U.S. Pat. No. 2,283,918 has disclosed a joining method for a metal band in which a tab is caulked into a recess. A bulky tool and powerful forces are required to produce the caulking.

U.S. Pat. No. 3,502,922 has disclosed a detent connection that is comprised of an insert tab and a recess. The insert tab is slid into the recess in order to produce a joint. The regions around the recess are designed to be elastic so that they can move outward and then spring back together when the insert tab is slid into the recess. This results in a certain amount of play between the parts.

Another possibility for mounting a ring onto an inner piece is the shrink-fitting technique. In this instance, the inner piece, for example, is cooled so that it shrinks. Only then can the ring be slid onto the inner piece. When the inner piece warms up again, a press fit is produced between the inner piece and the ring. The method, however, is costly and has the disadvantage that the joint comes apart if the ring and the inner piece cool or heat differently.

SUMMARY AND ADVANTAGES OF THE INVENTION

The workpiece according to the invention, has the advantage over the prior art that a workpiece can be simply mounted onto a component and there is no tolerance. After the joining process is complete, the workpiece has neither an axial nor a radial projection.

Advantageous modifications and improvements of the workpiece are also disclosed.

If the workpiece is a tube element, then it can advantageously be mounted onto an inner piece.

It is also advantageous for the recess to be designed similar to the shape of a dumbbell because this simplifies the plastic deformation for tolerance-free mounting.

The workpiece is advantageously comprised of metal because metal has a favorable capacity for plastic deformation.

BRIEF DESCRIPTION OF THE DRAWINGS

An exemplary embodiment of the invention is described herein below, with reference to the drawings, in which.

DESCRIPTION OF THE PREFERRED EMBODIMENT

Figure 1:
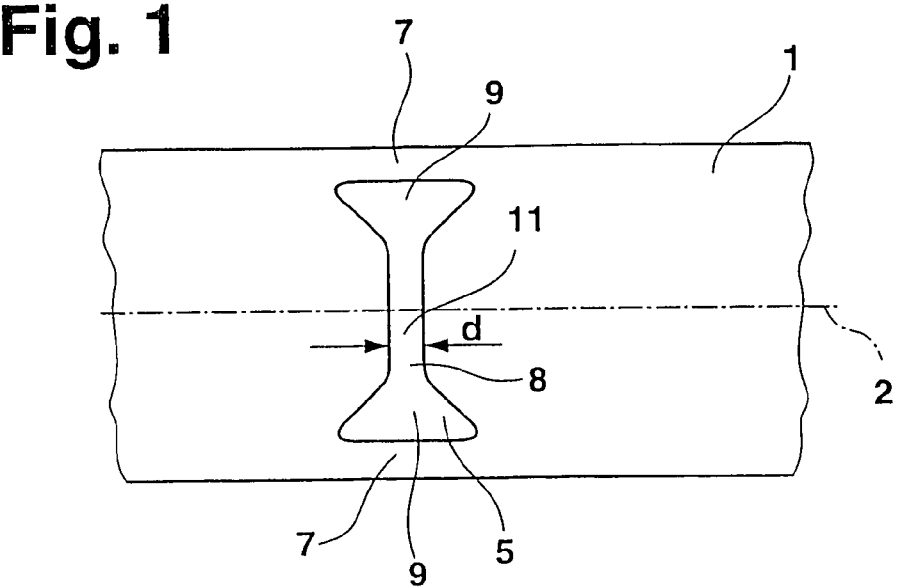
FIG. 1 shows a detail of a workpiece according to the invention, in the unmounted state.

FIG. 1 shows a partial section of a workpiece 1 according to the invention. The workpiece 1 can be a sheet metal band extending along a longitudinal axis 2 or a sheet metal ring and has at least one aperture of recess 5. The recess 5, which is embodied for example with a circumferentially closed border, has the shape, for example, of a dumbbell or a spool.

It is possible for the recess 5 to have any other shape. The recess 5 is designed so that in a strip-shaped edge region 7 of the workpiece 1, there is a greater empty volume 9 than in a middle region 8 of the recess 5.

In the middle region 8, there is a connecting segment 11 that extends perpendicular to the longitudinal axis 2, which connecting segment 11, in the direction of the longitudinal axis 2, has a thickness or, if the recess 5 is circular, a diameter d, which is sized so that it is almost or completely compressed, i.e. becomes zero, when the workpiece 1 is mounted. The connecting segment 11 connects the one larger empty volume in one edge region 7 to the other larger empty volume in the other edge region 7.

Figure 2:
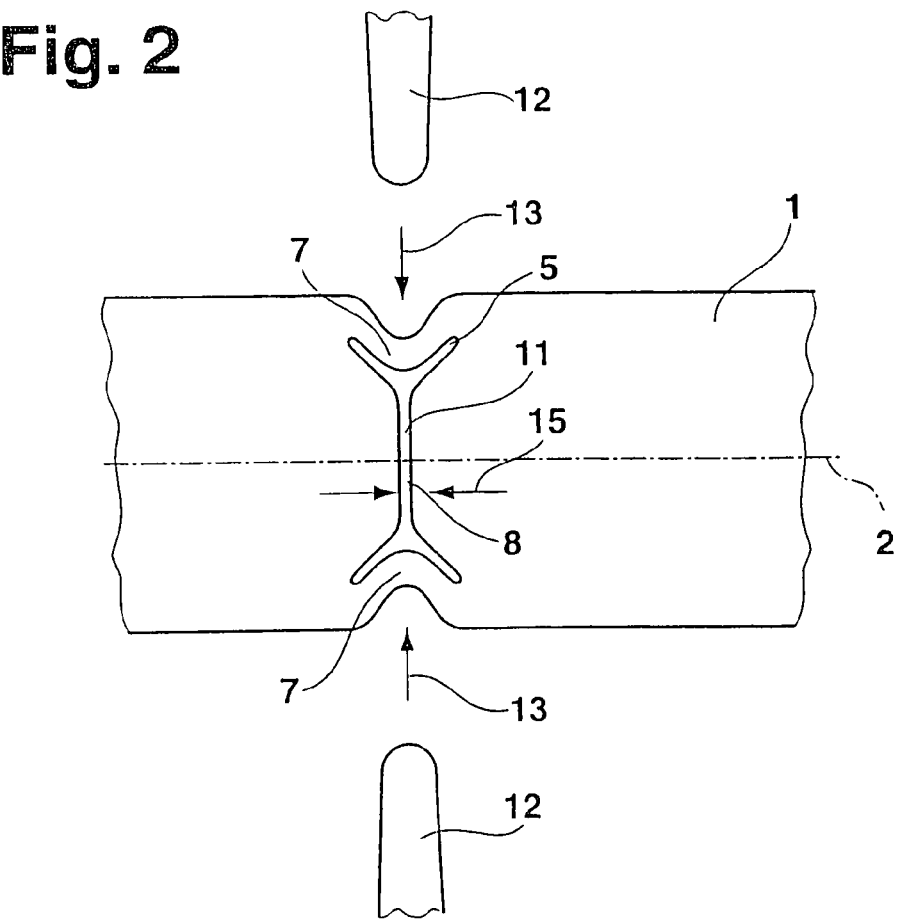
FIG. 2 shows a detail of a workpiece according to the invention, which is plastically deformed.

FIG. 2 shows a workpiece 1 according to the invention, which is plastically deformed. Starting with the workpiece 1 in FIG. 1, a tool 12 is placed against it, for example in each edge region 7, which tool exerts a force on the workpiece 1 in a deforming direction 13 lateral to the longitudinal axis 2 and compresses the empty volume 9 of the recess 5. This causes the workpiece 1 to contract in the direction of the longitudinal axis 2 in a dimension, a joining direction 15, perpendicular to the deforming direction 13. The empty volume 9 and the connecting segment 11 are almost or completely gone, for example. Since an external force exerted by the tool 12 can only be applied in an edge region 7 of the workpiece 1, it makes sense to design the recess 5 so that the greatest proportion of the empty volume 9 of the recess 5 is provided in this edge region 7 because then a plastic deformation requires only minimal forces and the plastic deformation can therefore be produced with considerable ease.

Figure 3A:
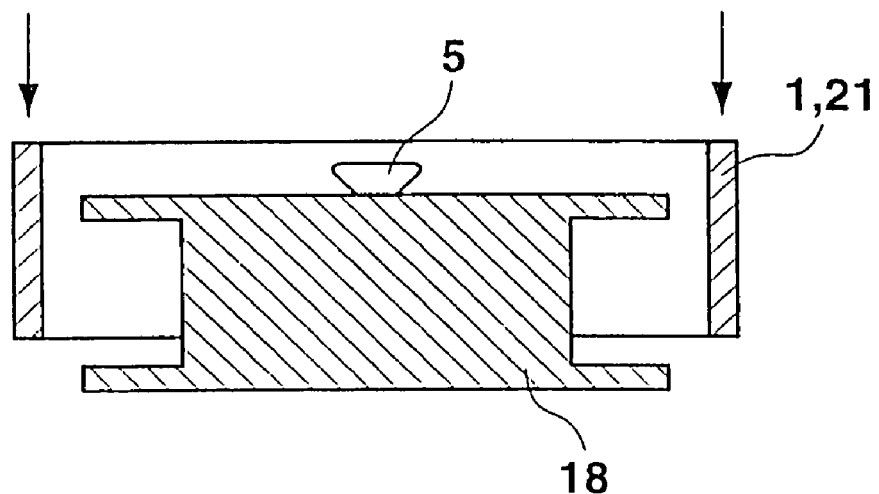
FIG. 3a shows how the workpiece according to the invention is slid over an inner piece.

FIG. 3a shows how a workpiece 1 is slid onto an inner piece 18. For example, the workpiece 1 is a tube element 21 and the inner piece 18 is a coil body of an electric machine, the tube element 21 in this instance constituting a magnetic yoke element. In comparison to a two-part tube element with a continuous connecting point according to the prior art, the tube element according to the invention has the advantage that there is no gap-encumbered transition that interrupts the flow of the magnetic field in the yoke element.

The tube element 21 has an inner diameter that is greater than the outer diameter of the inner piece 18. When the tube element 21 is plastically deformed by the tool 12, the tube element 21 rests snugly against the inner piece 18 and is thus fastened to the inner piece 18 (FIG. 3b).

Figure 3B:
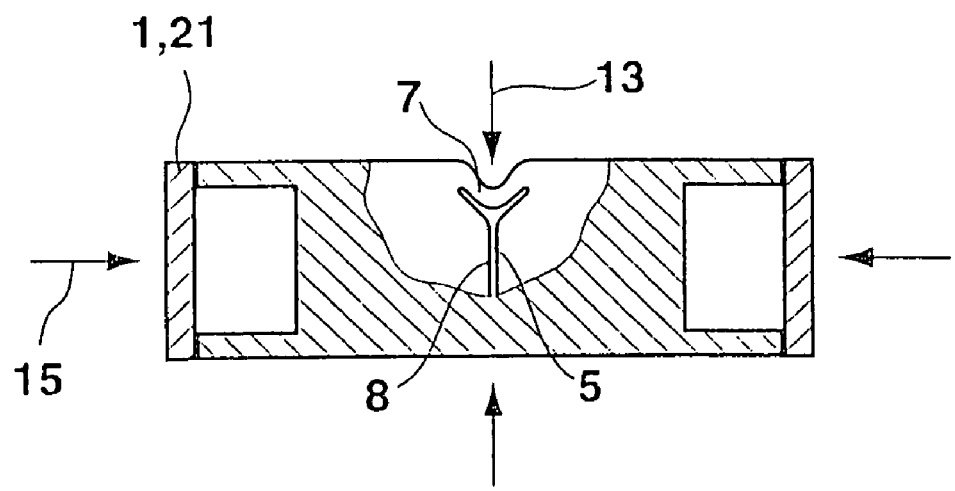
FIG. 3b shows how a workpiece according to the invention is mounted onto the inner piece.

FIG. 3b shows a tube element 21, which is fastened to an inner piece 18. The tool 12 has deformed the tube element 21, thus compressing the recess 5. This causes the tube element 21 to contract in a joining direction 15, i.e. in the case of the tube element 21, the inner diameter of the tube element 21 becomes smaller. The plastic deformation is executed until the inner diameter of the tube element 21 approximately corresponds to the outer diameter of the inner piece 18 and is deformed even further so that a sufficient force is produced, which presses the tube element 21 onto the inner piece 18.

The foregoing relates to preferred exemplary embodiments of the invention, it being understood that other variants and embodiments thereof are possible within the spirit and scope of the invention, the latter being defined by the appended claims.

The invention claimed is:

1. A method for securing a tube element (21) to an inner part (18) by plastic deformation, the tube element (21) having a closed cylindrical wall and, prior to securing the tube element (21) to the inner part (18), the wall having at least one recess (5), comprising:

placing the tube element (21) onto the inner part (18);

deforming the tube element (21) in the region of the at least one recess (5) with a tool by exerting a force on the tube element (21) in a deforming direction transversely to the diameter of the tube element, whereby the at least one recess is contracted transversely to the deforming direction and the diameter of the tube element is reduced; and continuing the deformation of the tube element (21) until the tube element is pressed radially onto the inner part (18).

2. The method according to claim 1, wherein the inner part (18) comprises a coil body of an electric machine.

3. The method according to claim 1, wherein the tube element (21) serves as a magnetic yoke element for an electric machine.

4. The method according to claim 1, wherein the recess (5) is designed to be similar to the shape of a dumbbell.

5. The method according to claim 1, wherein the tube element (21) is made of metal.

6. The method according to claim 1, wherein the tube element (21) is reduced in size in at least one dimension after the plastic deformation.

7. A tube element (21) adapted to be secured to an inner part (18), the tube element (21) comprising a plastically deformable material being embodied as a cylindrical wall with at least one recess (5), and the tube element being plastically deformed while being secured to the inner part by an exertion of force parallel to an axis of the tube element against the cylindrical wall in a region adjacent to the at least one recess disposed therein, whereby the cylindrical wall is reduced in diameter and the tube element is pressed onto the inner part.

8. The tube element according to claim 7, wherein the recess (5) is designed to be similar to the shape of a dumbbell.

9. The tube element according to claim 7, wherein the plastically deformable material is metal.

* * * * *